Figure 1:
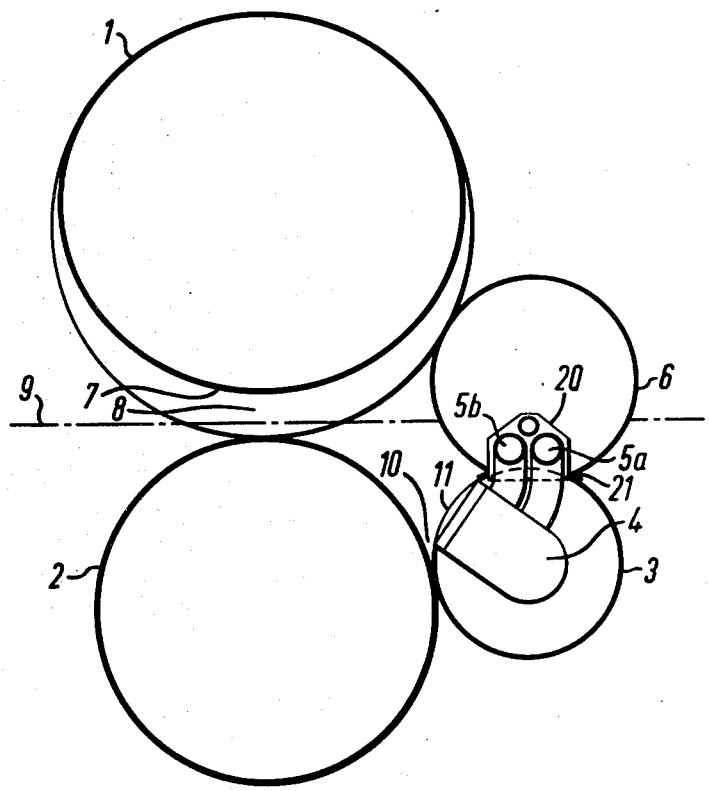

United States Patent [19]

Webb

[11] 4,310,415
[45] * Jan. 12, 1982

[54] ANTI-POLLUTION EQUIPMENT

[75] Inventor: Michael G. Webb, Wootton Bridge, England

[73] Assignee: The British Petroleum Company Limited, London, England

[*] Notice: The portion of the term of this patent subsequent to Jun. 10, 1998, has been disclaimed.

[21] Appl. No.: 125,517

[22] Filed: Feb. 28, 1980

[30] Foreign Application Priority Data

Mar. 6, 1979 [GB] United Kingdom ............... 7831/79

[51] Int. Cl.³ .............................................. E02B 15/04
[52] U.S. Cl. ................................. 210/242.3; 210/923; 405/63
[58] Field of Search .................. 210/242, DIG. 25; 405/63, 69

[56] References Cited

U.S. PATENT DOCUMENTS

| 3,221,884 | 12/1965 | Muller | 210/242 R |
| 3,369,664 | 2/1968 | Dahan | 210/242 |
| 3,476,246 | 11/1969 | Dahan | 210/242 R |
| 3,666,098 | 5/1972 | Garland et al. | 210/DIG. 25 |
| 3,883,433 | 5/1975 | Adams et al. | 210/DIG. 25 |
| 4,207,191 | 6/1980 | Webb | 210/242 S |

FOREIGN PATENT DOCUMENTS

| 1188156 | 4/1970 | United Kingdom . |
| 1383315 | 2/1975 | United Kingdom . |
| 2013582A | 8/1979 | United Kingdom . |
| 1554737 | 10/1979 | United Kingdom . |

Primary Examiner—Theodore A. Granger
Attorney, Agent, or Firm—Morgan, Finnegan, Pine, Foley & Lee

[57] ABSTRACT

A barrier for the containment and recovery of oil spilt on water comprises a first buoyant air chamber 1, a ballast water chamber 2, an oil and water discharge tube 3 and a second buoyant air chamber 6. The first air chamber 1 has a plurality of sections of reduced diameter 7, which together with the ballast water chamber 2 define a series of weirs for oil and water to pass into a gallery formed by the ballast water chamber 2, the oil and water discharge tube 3 and the second air chamber 6. Pumps 4 may be provided in the oil and water discharge tube 3 to remove oil from the gallery. The second air chamber 6 provides buoyancy to maintain the optimum configuration of the weirs.

4 Claims, 3 Drawing Figures

ANTI-POLLUTION EQUIPMENT

The present invention relates to a barrier for the containment and recovery of oil spilt on water.

In recent years several instances of oil spillage at sea have occurred and many proposals have been made for the containment and recovery of spilt oil. Most systems proposed have been designed to cope with finite spillages which may occur when a tanker or other oil carrying vessel is involved in an accident. With the increase in offshore oil production there is an increasing possibility of oil pollution occurring on a large scale should oil wells blow out or oil pipes rupture. Although every precaution is taken to prevent such disasters and to minimise their effect by incorporating oil shut-off devices within oil production units there nevertheless remains the possibility that an accident to an oil production unit or to a very large tanker could produce a continuing source of oil pollution which would extend the capability of known oil containment and recovery systems.

British Patent Specifications Nos. 1,188,156 and 1,383,315 and 1,554,737 describe barriers for oil spilt on water which comprise one or more air chambers and one or more water chambers, all the walls of the chambers being formed of flexible material, the chambers being so positioned that when suitably inflated with air and water the barriers will float with part below and part above the water surface so as to impede the passage of floating oil. Such a barrier is very effective for impeding the flow of oil and forming a corral within which the oil can be collected. The collected oil then must be removed by some form of skimming device. The rate of oil removal is thus limited to the capacity of the skimming device employed.

A barrier for the containment of oil split on water which can also be employed in its recovery is described in British Patent Specification No. 1,552,642. The barrier comprises at least one air chamber, at least one ballast water chamber and at least one water chamber of greater buoyancy than the ballast water chamber. The chambers are so positioned that when in use, the air chamber and ballast water chamber together form a barrier for oil spilt on water and the further water chamber defines a weir between itself and the other chambers. The barrier is provided with means to remove oil and water from the weir.

An improved design for an oil containment boom which can also recover oil spilt on water is disclosed in our co-pending British Patent Application No. 79 02286, published as Application No. 2,013,583A, and in copending U.S. patent application Ser. No. 005,789, now issued as U.S. Pat. No. 4,207,191.

The barrier comprises an elongate, flexible, buoyant, inflatable air chamber having a plurality of sections of reduced diameter; an elongate, flexible, inflatable ballast water chamber; an elongate, flexible oil and water discharge tube; and an elongate membrane, one end of the membrane being connected to the exterior of the air chamber and the other to the exterior of the ballast water chamber or the oil and water discharge tube to form a gallery; the buoyant air chamber and the oil and water discharge tube being joined to the ballast water chamber in side-by-side relationship; the chambers, tube and membrane being so positioned relative to one another that when in use on oil polluted water the buoyant air chamber and the ballast water chamber together form a barrier for oil spilt on water except in the sections of reduced diameter of the buoyant air chamber; these sections and the ballast water chamber defining a series or weirs for oil and water to pass into the gallery; the oil and water discharge tube being provided with means to remove oil and water from the gallery.

The oil and water discharge tube may be inside or outside of the ballast water chamber. If it is outside, then the gallery is formed by the ballast water chamber, the oil and water discharge tube and the membrane. If it is inside, then the gallery is formed by the ballast water chamber and the membrane.

Such barriers while effective in use, have a slight tendency to pivot away from the vertical because of the weight of oil and water in the discharge tube. This pivoting means that a less than optimum configuration of the weirs is presented to an oil slick, resulting in a decreased rate of recovery.

It is an object of the present invention to provide an antipollution barrier which maintains the optimum configuration of the weirs.

Thus, according to the present invention there is provided a barrier for the containment and recovery of oil spilt on water, the barrier comprising (1) a first elongate, flexible, buoyant, inflatable air chamber having a plurality of sections of reduced diameter; (2) an elongate, flexible, inflatable ballast water chamber; (3) an elongate, flexible oil and water discharge tube; and (4) a second elongate, flexible, buoyant, inflatable air chamber; the first air chamber, the ballast water chamber, the oil and water discharge tube and the second air chamber being joined together in side-by-side relationship; the chambers and the tube being so positioned relative to one another that, when in use on oil polluted water, the first air chamber and the ballast water chamber together form a barrier for oil spilt on water except in the sections of reduced diameter of the air chamber, these sections and the ballast water chamber defining a series of weirs for oil and water to pass into a gallery; the gallery being formed by the ballast water chamber, the oil and water discharge tube and the second air chamber; the oil and water discharge tube being provided with means to remove oil and water from the gallery.

The chambers of the present invention are essentially similar to those described in UK Patent Specification No. 1,188,156 and are flexible in order that they can follow the movement of the sea so that the barrier remains effective under sea conditions that would severely reduce the efficiency of a rigid barrier. Suitably they are made of sheets of flexible material, e.g. neoprene coated nylon or other similar material. The flexibility of the material forming the barrier allows it to be stored, when deflated, in a comparatively small volume.

The chambers and tube can be readily prepared from flat sheet material by welding or otherwise joining the sheets together.

The first flexible buoyant air chamber and the ballast water chamber serve essentially the same function as the air and water chambers described in UK Patent Specification No. 1,188,156. In practice it is found that good results are obtained when the cross sectional area of the unreduced sections of the air chamber and the ballast water chamber are substantially the same but of course barriers can readily be prepared in which the cross-sectional areas vary, for example, in the ratio of 1:4 to 4:1. UK Patent Specification No. 1,383,315 describes the use of a pilot air tube in association with the air chamber in order to aid the deployment and recovery of the barrier. Such a pilot tube can usefully be incorporated into the barrier according to the present invention.

As previously stated, the first buoyant air chamber and the water ballast chamber form for the greater proportion of their length a barrier for oil and water. However, periodically the diameter of the air chamber is reduced, thus leaving gaps above the water chamber and between the water chamber and the sections of the air chamber of reduced diameter. In use, these gaps form weirs over which oil and water passes into the gallery where it is restrained by the oil and water discharge tube and the second buoyant air chamber and removed by the oil and water discharge tube.

Preferably the sections of the first air chamber of reduced diameter are produced by tapering the diameter of the air chamber to a lesser value than the original, maintaining the diameter at the lesser value for some length and then increasing the diameter again to its original value.

The sections of reduced diameter may extend in total over 10–50% of the length of the barrier, preferably over 15–30%. The amount by which the diameter is reduced is not critical provided that it leaves a gap sufficient to cope with the flow of oil and water over the weirs. In general, a reduction in diameter of 10–50%, preferably 15–30%, will be sufficient to form satisfactory gaps for the weirs.

In use the barrier will first have to be deployed and then the various chambers inflated with air or water as appropriate.

The techniques described in Patent Specifications Nos. 1,188,156 and 1,383,315 can be used to inflate the chambers with air or sea water.

In operation oil entrapped within the boom will spill over the weir with sea water into the gallery from which it must be removed. Suitable removal means comprise a series of drain holes in the oil and water discharge tube opening into the gallery, through which the oil water mixture can flow into a collection vessel. Such drain holes can readily be provided in the manufacture of the barrier near the join of the oil and water discharge tube with the ballast water chamber. Pumps may be provided in the discharge tube positively to pump recovered oil and water out of the barrier through the tube to storage.

The second buoyant inflatable air chamber may be positioned above the oil and water discharge tube and provides buoyancy to counteract the pivoting tendency of the latter about the vertical axis of the first air chamber and the ballast water chamber.

The position of the interface between the second air chamber and the oil and water discharge tube relative to the water surface is not critical and may vary depending on the relative sizes of the various chambers and the tube. The important factor is that the drain holes in the oil and water discharge tube should be below the water surface.

The first and second air chambers may be inflated using a common pump and air supply. Preferably, however, they are capable of being inflated independently so that the pressure inside the two chambers can be different if required.

By controlling the pressure of the air inside the second air chamber, and varying it in relation to the pressure inside the first air chamber, the pivoting tendency of the oil and water discharge tube may be counteracted to a greater or lesser extent, and thus the attitude of the barrier, and the weir height in particular may be altered.

Under normal operating conditions, the first air chamber is maintained, fully inflated, at a substantially constant pressure, and the pressure within the second air chamber is preferably lower than, and may be varied in relation to, the pressure inside the first air chamber.

An additional advantage of inflating the first and second air chambers independently is that the barrier will retain some buoyancy in the event of one or other of the air chambers being damaged and deflating.

The cross-sectional area of the second air chamber is preferably smaller than the cross-sectional area of the unreduced section of first air chamber and they may, for example, be in the ratio of from 1:16 to 9:16. In practice it is found convenient for the second air chamber to have substantially the same cross-sectional area as the oil and water discharge tube, and for this area to be about one quarter that of the unreduced sections of the first air chamber.

A useful storage vessel can be formed by a tanker which has been equipped with means for separation of oil and water, for example, a tank fitted with a series of baffles, so that the oil can be stored and the water returned to the sea.

If the storage vessel is a large tanker, the amount of effort required to pump recovered oil and water aboard in a conventional manner is considerable. Preferably such a vessel is modified to take on the oil and water at a low level, e.g. by an entry port near or below sea level.

Preferred barriers comprise a single first air chamber, a single ballast water chamber, a single discharge tube and a single second air chamber. However, the function of each of these may be achieved by replacing each of them or any or all of them with two or more separate items if desired.

The barrier is preferably used in conjunction with sections of standard barrier of the type described in British patent specifications Nos. 1,188,156, 1,383,315 or 1,554,737. The combined barrier is preferably used in a J configuration with sections of standard barrier forming the arms and being attached to a support vessel or sea anchors and a section of weir barrier according to the present invention forming the curved base where the oil collects.

Figure 2:
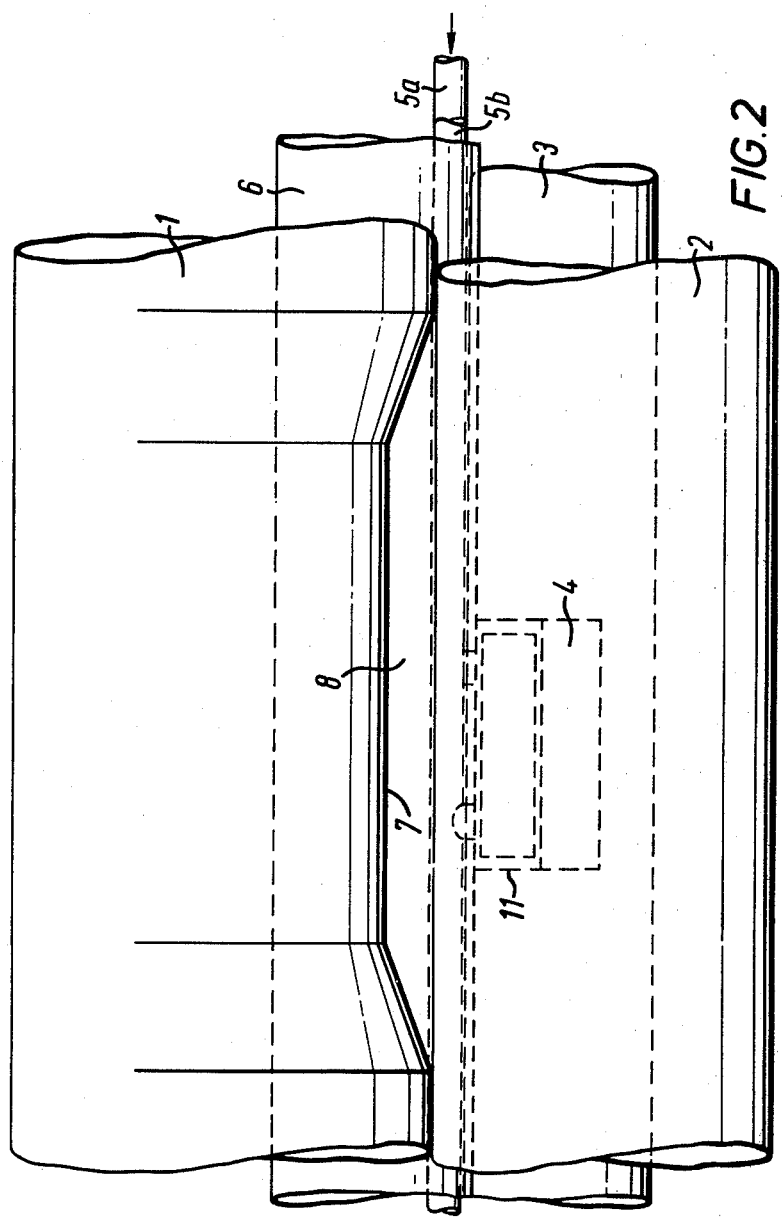
Figure 3:
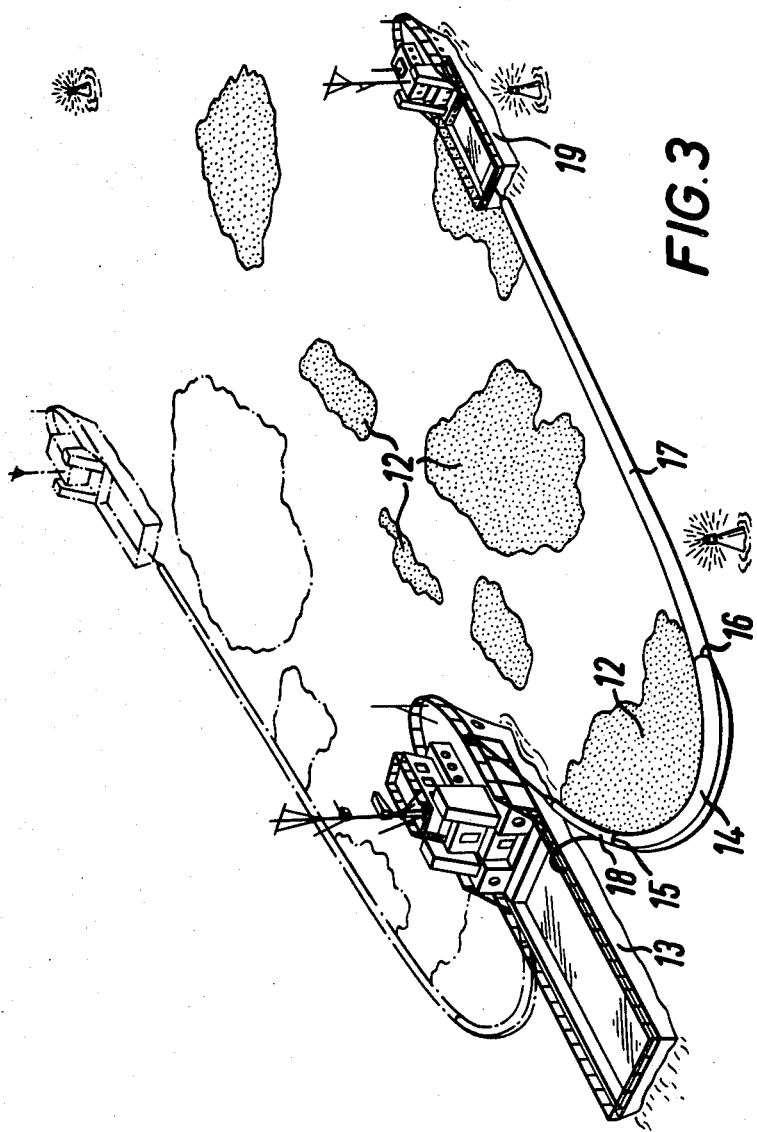

The invention is illustrated with reference to FIGS. 1–3 of the accompanying drawings wherein FIG. 1 is a vertical cross section of a weir trap boom.
FIG. 2 is a side elevation of the boom of FIG. 1 and
FIG. 3 is a schematic representation of a deployed boom system.

With reference to FIGS. 1 and 2, the weir trap boom comprises a first buoyant air chamber 1, a ballast water chamber 2, an oil and water discharge tube 3 containing a hydraulically operated pump unit 4 and a second buoyant air chamber 6.

The air chamber 1 has sections 7 of reduced diameter which leave gaps 8 between the air chamber 1 and the water chamber 2.

Hydraulic fluid is carried to and from the pump unit 4, contained in the oil and water discharge tube 3, by lines 5a and 5b. In order to protect these lines and their associated fittings from the oil and sea water, they are run along inside the second air chamber 6. They are connected to the pump unit 4 via a manifold 20, which protrudes from the oil and water discharge tube 3 into the second air chamber 6 through a seal 21.

In use the boom floats in relation to sea water level 9 as shown in FIG. 1. The gaps 8 thus create weirs over which the interface of oil and water flows. The second air chamber 6 co-operates with the oil and water discharge tube 3 and the ballast water chamber 2 to form a gallery 10 which retains the mixture of oil and water before it is removed from the boom.

Removal is effected through apertures 11 and the discharge tube 3 from which pump units 4 takes suction.

FIG. 3 shows an oil spillage 12 which is drifting in the direction of a service vessel 13 to which a barrier 14 according to the present invention has been attached. The barrier 14 is connected at points 15 and 16 to conventional barriers 17 and 18 which may be of the type described in UK patent specification No. 1,554,737. These in turn are connected respectively to the service vessel 13 and a boom deployment vessel 19 which provides the power to inflate the various chambers of the barrier appropriately. In practice the air and water chambers of the conventional barriers 17 and 18 can be connected directly with the corresponding chambers of the barriers according to the present invention. The oil and water discharge tube, not shown in FIG. 3, runs to a point in the service vessel 13 so that the oil and water mixture from the weirs is pumped to an appropriate place within the vessel where separation can be effected. The separated oil can then be stored in the vessel and water, once sufficiently purified, can be returned to the sea.

The system as shown in FIG. 3 can continue in operation for long periods provided that the vessel 13 and the support boat 19 can keep station around the oil spillage 12 in such a way that the oil is driven into the weir boom section 14.

I claim:

1. A barrier for the containment and recovery of oil spilt on water, the barrier comprising a first elongate, flexible, buoyant, inflatable air chamber having a plurality of sections of reduced diameter; an elongate, flexible, inflatable ballast water chamber; an elongate, flexible oil and water discharge tube; a second elongate, flexible, buoyant, inflatable air chamber; the first air chamber, the ballast water chamber, the oil and water discharge tube and the second air chamber being joined together in side-by-side relationship; the chambers and the tube being so positioned relative to one another that, when in use on oil polluted water, the first air chamber and the ballast water chamber together form a barrier for oil spilt on water except in the sections of reduced diameter of the air chamber, these sections and the ballast water chamber defining a series of weirs for oil and water to pass into a gallery; the gallery being formed by the ballast water chamber, the oil and water discharge tube and the second air chamber; the oil and water discharge tube being provided with means to remove oil and water from the gallery.

2. A barrier according to claim 1 in which the ratio of the cross-sectional area of the second air chamber to the cross-sectional area of the first air chamber is in the range 1:16 to 9:16.

3. A barrier according to claim 1 in which the first and second air chambers can be independently inflated.

4. A barrier according to claim 3 in which the pressure inside the second air chamber may be varied relative to the pressure in the first air chamber.

* * * * *